(12) United States Patent
Seymour

(10) Patent No.: US 6,343,675 B1
(45) Date of Patent: Feb. 5, 2002

(54) ADJUSTABLE DISC BRAKE BRACKET

(76) Inventor: Robert J. Seymour, 37 Bunbury Way, Epson, Surrey, KT17 4JP (GB)

(*) Notice: Subject to any disclaimer, the term of this patent is extended or adjusted under 35 U.S.C. 154(b) by 0 days.

(21) Appl. No.: 09/910,857

(22) Filed: Jul. 24, 2001

(51) Int. Cl.[7] ................................................. B62L 5/00
(52) U.S. Cl. ...................................... 188/26; 188/24.11
(58) Field of Search ................................ 188/24.11, 26, 188/72.1, 344; 280/276, 279

(56) References Cited

U.S. PATENT DOCUMENTS

| | | | | |
|---|---|---|---|---|
| 4,878,558 A | * | 11/1989 | Asakura | 180/219 |
| 5,957,244 A | * | 9/1999 | Turner | 188/26 |
| 5,960,914 A | * | 10/1999 | Isai | 188/72.8 |
| 5,979,609 A | * | 11/1999 | Tsai | 188/26 |

* cited by examiner

Primary Examiner—Christopher P. Schwartz
(74) Attorney, Agent, or Firm—Dougherty & Troxell

(57) ABSTRACT

Adjustable disc brake bracket especially applicable to rally bicycle. The disc brake bracket includes an upper bracket, a lower bracket, an adjustment section, an insertion section, a retaining seat and a stop section. The adjustment section is positioned between the upper and lower brackets for adjusting the angle contained thereby. The insertion section is a notch formed on lower end of the lower bracket and fitted on the end of the wheel shaft. The retaining seat is mounted on the upper bracket for fixedly connecting with the disc brake apparatus of the bicycle. The stop section is disposed on the upper bracket for abutting against the frame body of the bicycle.

11 Claims, 9 Drawing Sheets

ADJUSTABLE DISC BRAKE BRACKET

BACKGROUND OF THE INVENTION

The present invention is related to a fixing device for disc brake of a bicycle, and more particularly to an adjustable disc brake bracket of a rally bicycle.

A conventional bicycle brake device generally includes two brake shoes mounted on the front and rear forks near the rims of the wheels. The brake shoes are controlled by the handles to clamp or not to clamp the rims so as to brake and decelerate or stop the bicycle.

FIG. 1 shows an improved bicycle brake device. A disc brake apparatus 93 is mounted on the fork 91 near the wheel shaft and can brake a coaxial disc 92 with the wheel shaft. Such disc brake device can more quickly brake the bicycle. The fork 91 is equipped with a fixing structure such as a fixing lug 94 or a fixing hole. A bolt 95 is used to lock the disc brake apparatus 93 on the fork 91.

Furthermore, referring to FIG. 2, the above disc brake device can be applied to rally racing bicycle (so-called BMX) for a racer to more effectively decelerate or stop the bicycle when encountering irregular road face or obstruction.

But not all of bicycles possess the fixing structure for mounting the disc apparatus 93. U.S. Pat. No. 5,957,244 discloses a brake bracket for easily and quickly mounting the disc brake apparatus 93.

The braking force and the pulling force exerted onto the transmission chain of the BMX are greater than a common bicycle. Therefore, the transmission chain is likely to be deformed and elongated. At this time, it is necessary to replace the transmission chain or sprocket and adjust the distance between the front and rear shafts in accordance with the tightness of the transmission chain. A rear claw formed with a split 96' is mounted on the rear fork for facilitating adjustment of the distance between the front and rear wheels. The split 96' can be horizontal or inclined.

After adjusting the distance between the front and rear wheels, the disc 92 mounted on the wheel shaft must be also moved back or forth. However, the disc brake apparatus 93 mounted on the fixing lug 94 of the rear end 96 cannot be moved. As a result, the lining plates 93' can be hardly accurately aligned with the frictional section 92' of outer circumference of the disc 92. This greatly reduces the braking effect.

The brake bracket, U.S. Pat. No. 5,957,244, which enables the disc brake apparatus to move in accordance with the change of the distance between the front and rear wheels. Such brake bracket is formed with an opening in which the wheel shaft is inserted and locked by a bolt. Once the brake bracket is moved, the bracket can be hardly effectively retained or held. Therefore, such brake bracket can hardly bear the strong frictional torque when braking the bicycle and is likely to swing (angular displacement). This affects the braking effect.

SUMMARY OF THE INVENTION

It is therefore a primary object of the present invention to provide an adjustable disc brake bracket which can easily and quickly adjust the position of the disc brake in accordance with the change of the distance between the front and rear wheels of a rally bicycle. Such disc brake bracket is able to bear the strong frictional torque when braking the bicycle and achieve a fully braking effect.

According to the above object, the adjustable disc brake bracket includes an upper bracket, a lower bracket, an adjustment section, an insertion section, a retaining seat and a stop section.

The present invention can be best understood through the following description and accompanying drawings wherein:

DETAILED DESCRIPTION OF THE PREFERRED EMBODIMENTS

Figure 1:
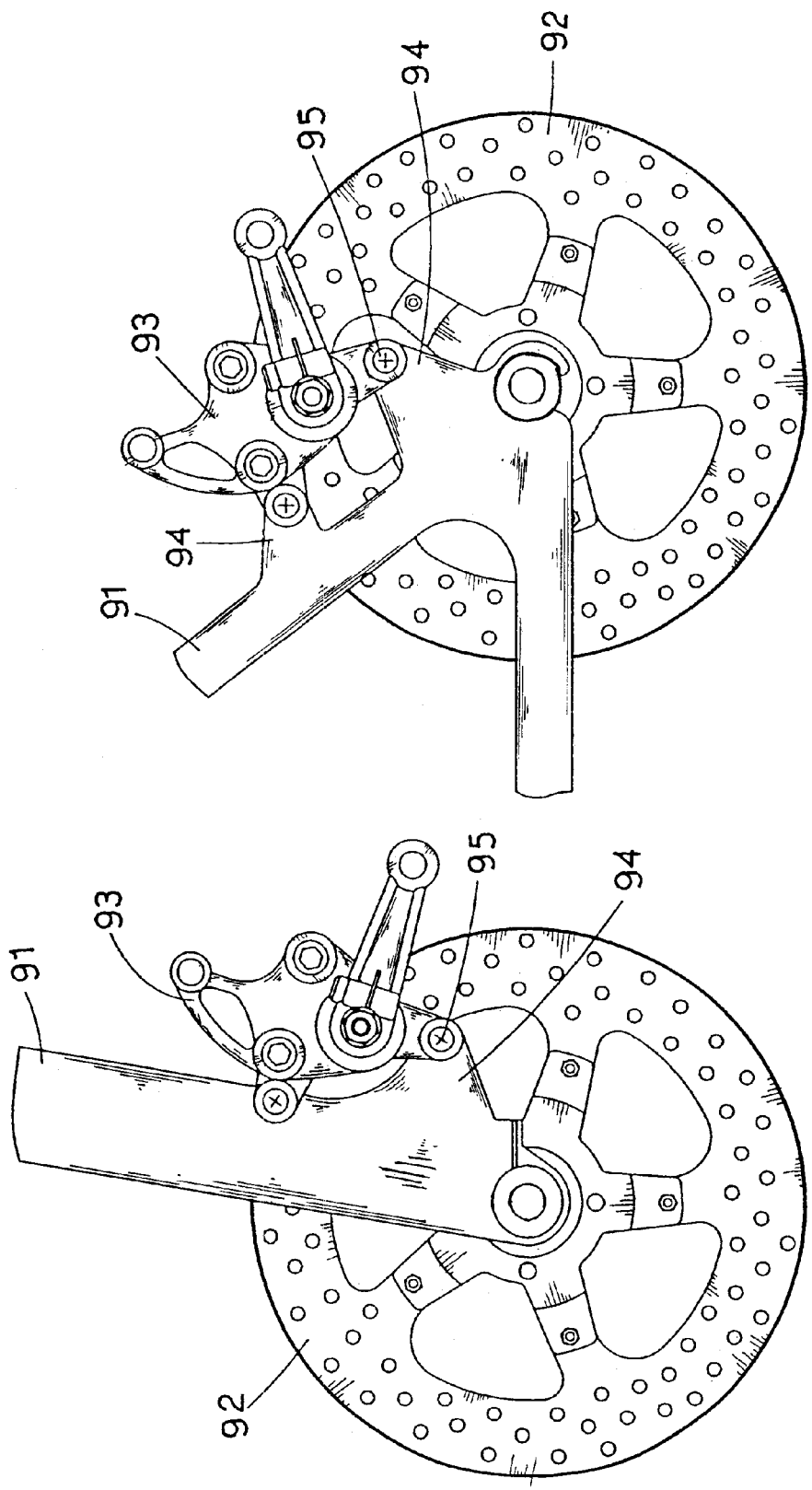
FIG. 1 is a front view of a conventional disc brake.
Figure 2:
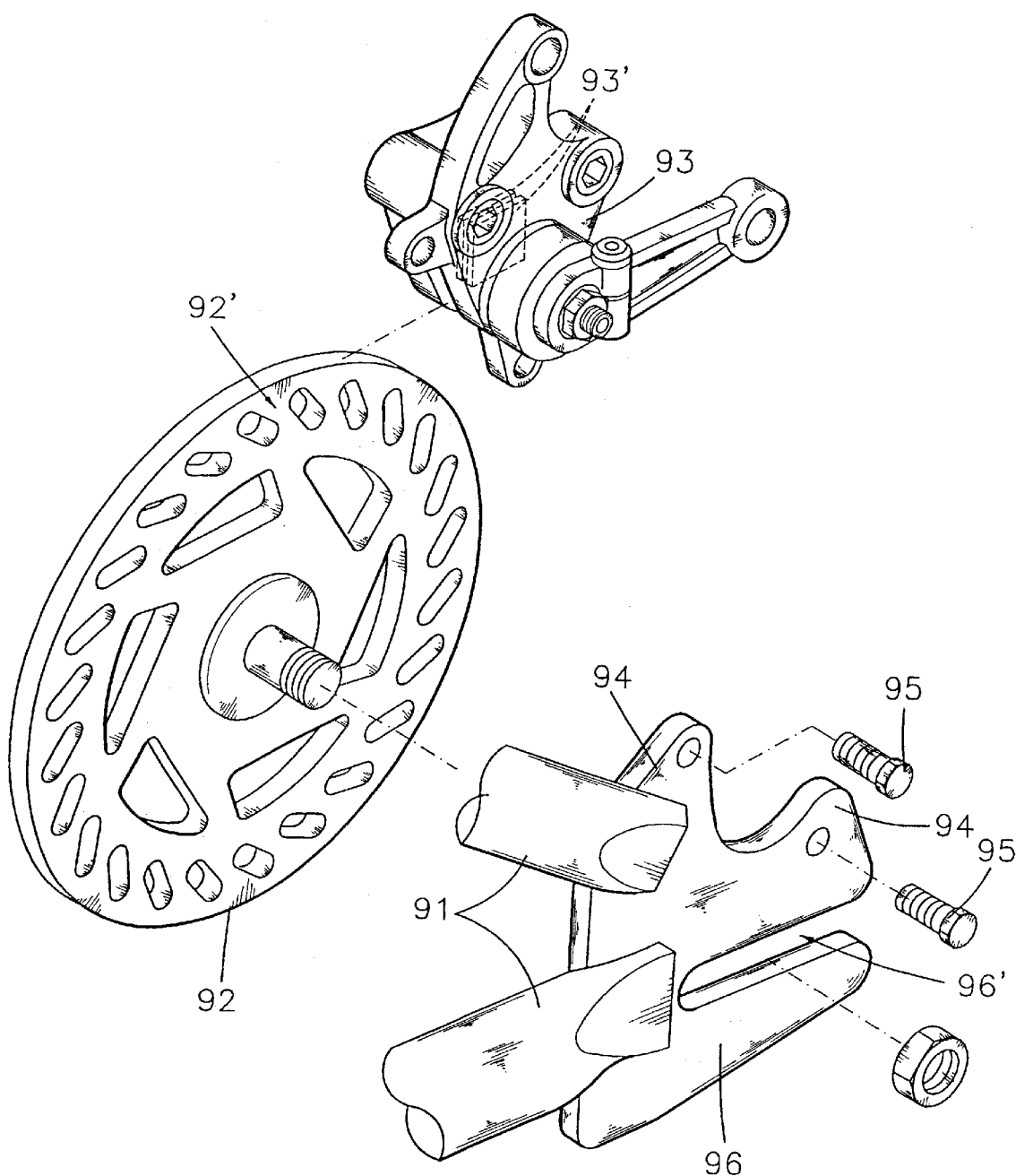
FIG. 2 is a perspective exploded view of another type of conventional disc brake.
Figure 3:
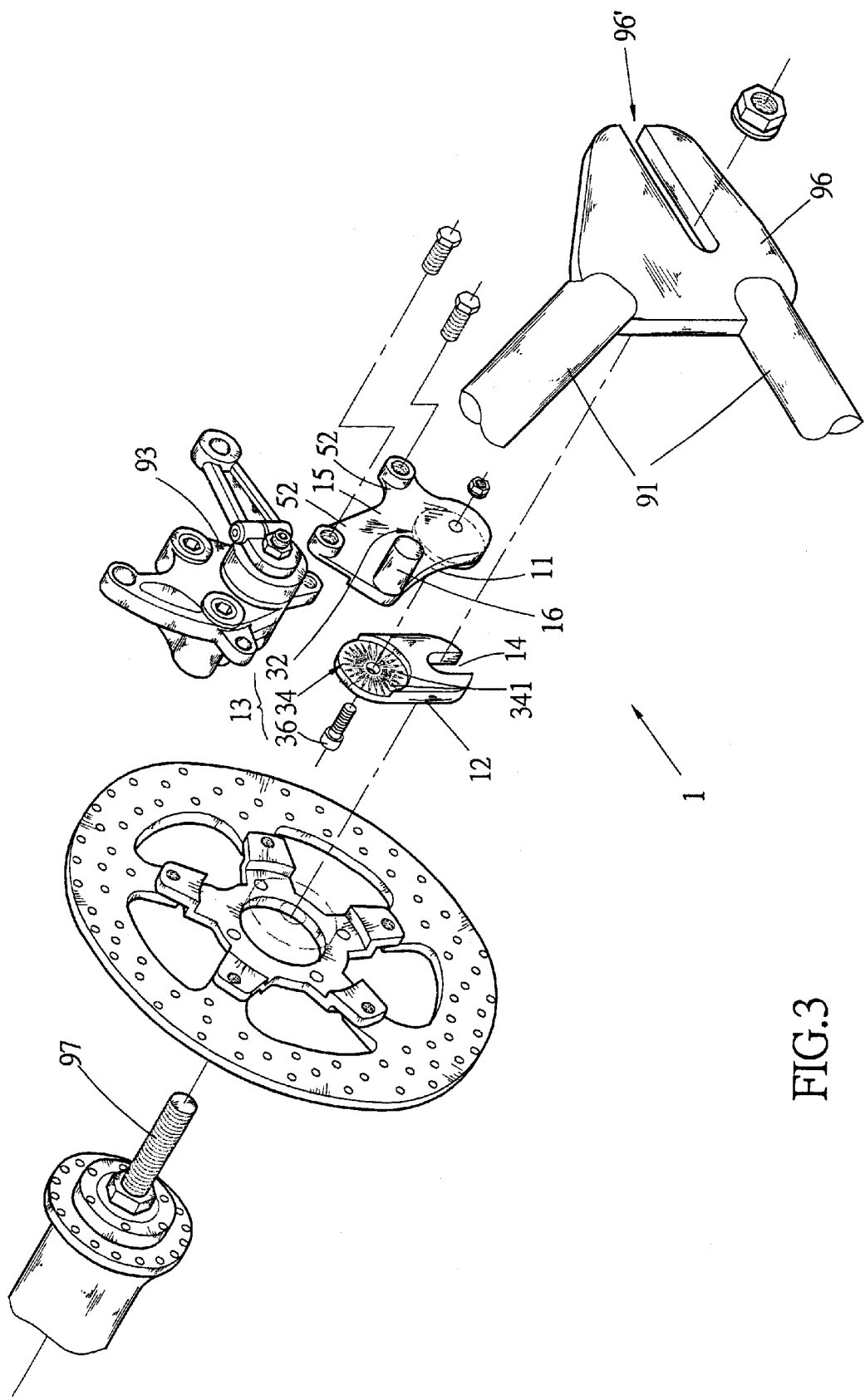
FIG. 3 is a perspective exploded view of a first embodiment of the present invention.
Figure 4:
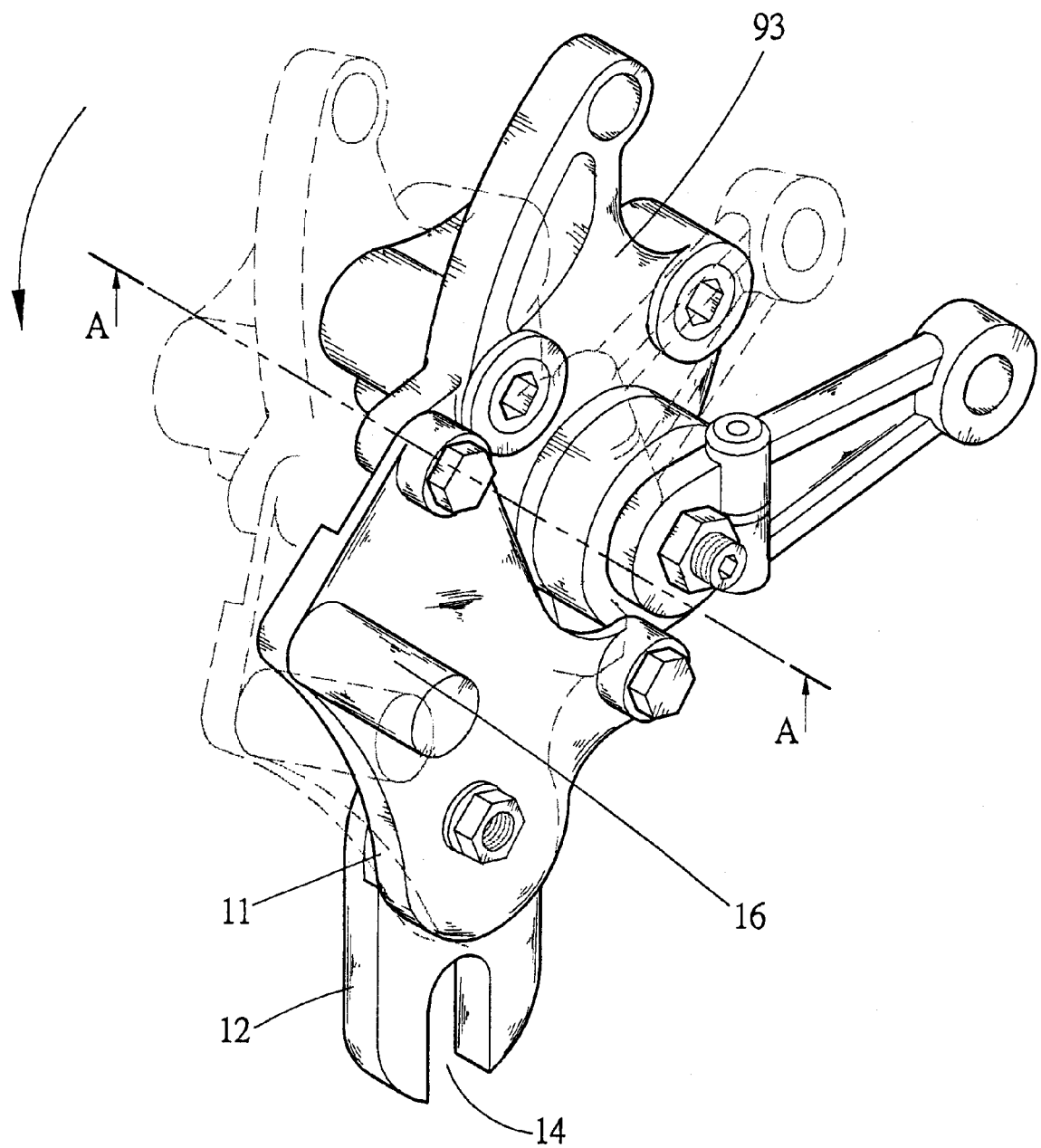
FIG. 4 is a perspective view showing the adjustment of the angle contained by the upper and lower brackets of the first embodiment.
Figure 5:
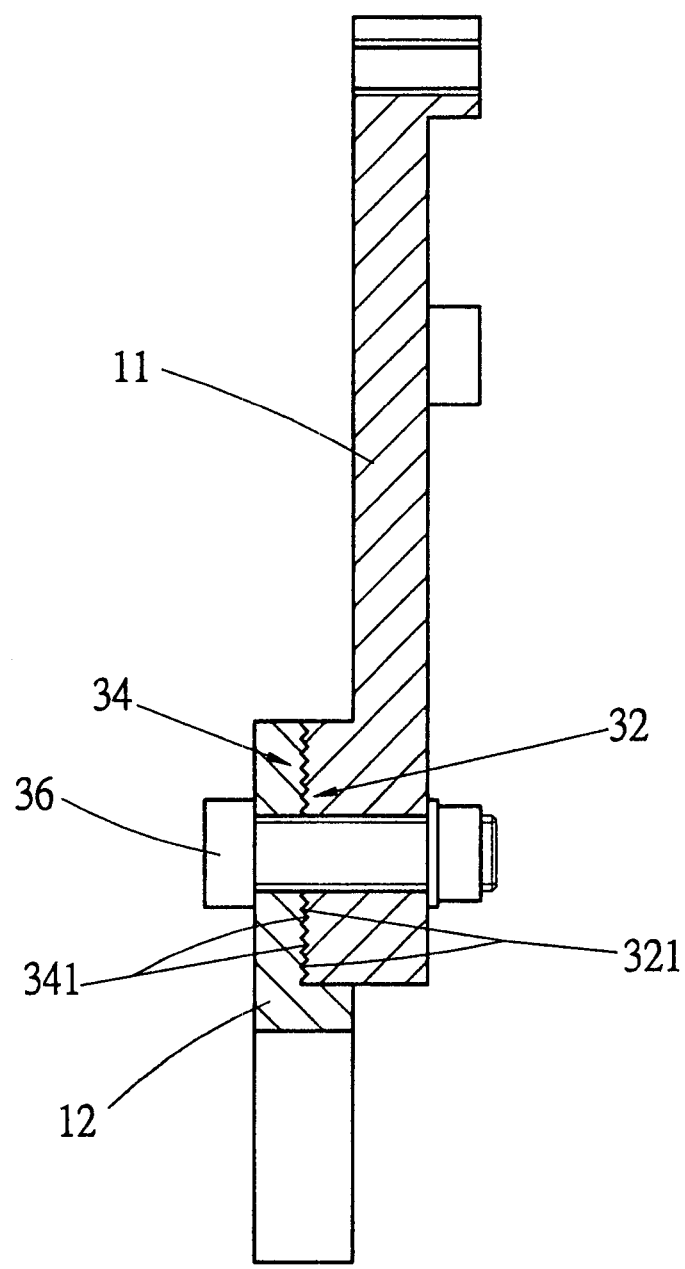
FIG. 5 is a sectional view taken along line A—A of FIG. 4.

Please refer to FIGS. 3 to 5. The adjustable disc brake bracket 1 of the present invention is mounted on an end of the wheel shaft 97 of a bicycle. The bracket 1 includes an upper bracket 11, a lower bracket 12, an adjustment section 13, an insertion section 14, a retaining seat 15 and a stop section 16.

The upper bracket 11 is a plate body having a predetermined shape.

The lower bracket 12 is a plate body having a predetermined shape and disposed below the upper bracket 11.

The adjustment section 13 is positioned between the upper and lower brackets 11, 12 for connecting the upper and lower brackets and adjusting the angle contained thereby. The adjustment section 13 includes an upper engaging section 32, a lower engaging section 34 and a fixing key 36.

The upper engaging section 32 is formed by several radial interval teeth 321 formed on a predetermined portion of the upper bracket 11 such as rear face of lower portion thereof. The upper engaging section 32 is formed with a through hole at the circular center.

The lower engaging section 34 is formed by several radial interval teeth 341 formed on the front face of upper portion of the lower bracket 12 corresponding to the upper engaging section 32. The lower engaging section 34 is formed with a through hole at the circular center.

The fixing key 36 is fitted in the through holes of the upper and lower engaging sections 32, 34 for fixing the teeth 321, 341 thereof.

The insertion section 14 is a notch formed on lower end of the lower bracket 12. The insertion section 14 is coaxially fitted on the end of the wheel shaft 97.

The retaining seat 15 is a plate body outward extending from one end of short axis of the upper bracket 11 by a predetermined length and having a predetermined shape. The extending direction of the retaining seat 15 and the short axis of the upper bracket 11 contain a predetermined angle. The lateral side of the retaining seat 15 has a retaining section 52 for fixedly connecting with the disc brake apparatus 93 of the bicycle.

The stop section 16 is a projection disposed on the left end of the upper bracket 11 for abutting against the fork body 91 of the bicycle.

According to the above structure, when the wheel shaft 97 of the bicycle is moved as necessary, by means of the teeth 321, 341 of the upper and lower engaging sections 32, 34 of the adjustment section 13, the upper and lower brackets 11, 12 can be rotated to adjust the angle contained thereby. In addition, the fixing key 36 serves to fix the upper bracket 11, whereby the position of the stop section 16 can be changed to truly abut against the frame body of the bicycle and effectively bear the frictional torque when braked and achieve a fully braking effect.

The disc brake bracket 1 of the present invention has the following advantages:
1. By means of the adjustment section 13, the bracket 1 can immediately and effectively abut against the frame body of the bicycle so as to achieve fully braking effect.
2. By means of the adjustment section 13, the bracket 1 is applicable to different types of frame bodies of bicycles.

In the above embodiment, the fixing key 36 can be a thread rod and a nut.

The insertion section 14 of the above embodiment has an open end.

In the above embodiment, the retaining section 52 is formed by two lugs outward extending from the right side of the retaining seat 15 and spaced by a predetermined distance. Each lug is formed with a hole for connecting with the disc brake apparatus 93 by screws.

Figure 6:
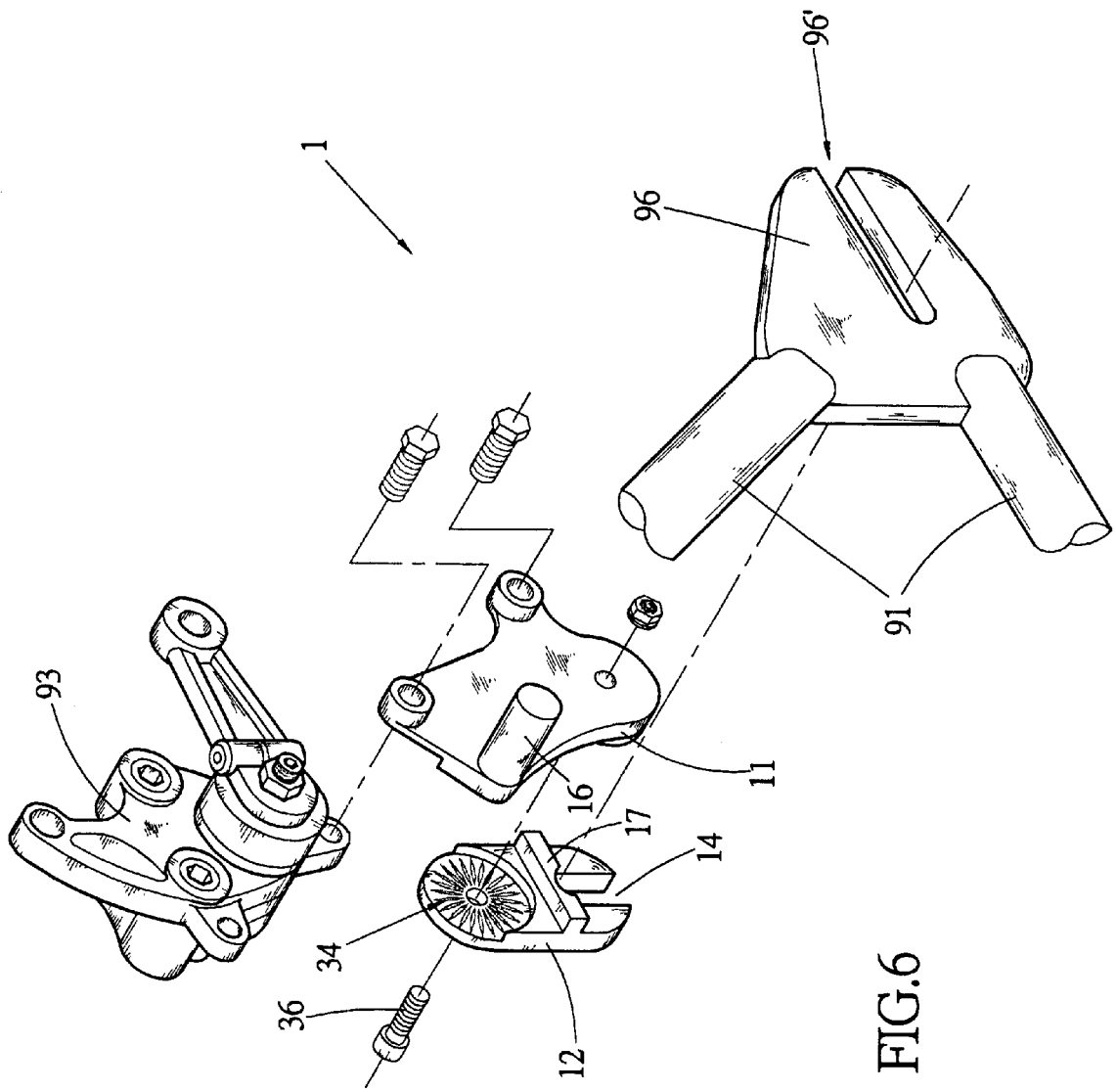
FIG. 6 is a perspective exploded view of a second embodiment of the present invention.

FIG. 6 shows another embodiment of the present invention, in which the bracket further includes a fixing section 17 which is a rectangular projecting block adjacent to the insertion section 14 and outward projecting from the front face of the lower bracket 12. The width of the fixing section 17 is equal to the width of the split 96' of the rear end 96 of the bicycle. The fixing section 17 is fitted in the split 96' so as to more effectively resist against the frictional torque when braked.

Figure 7:
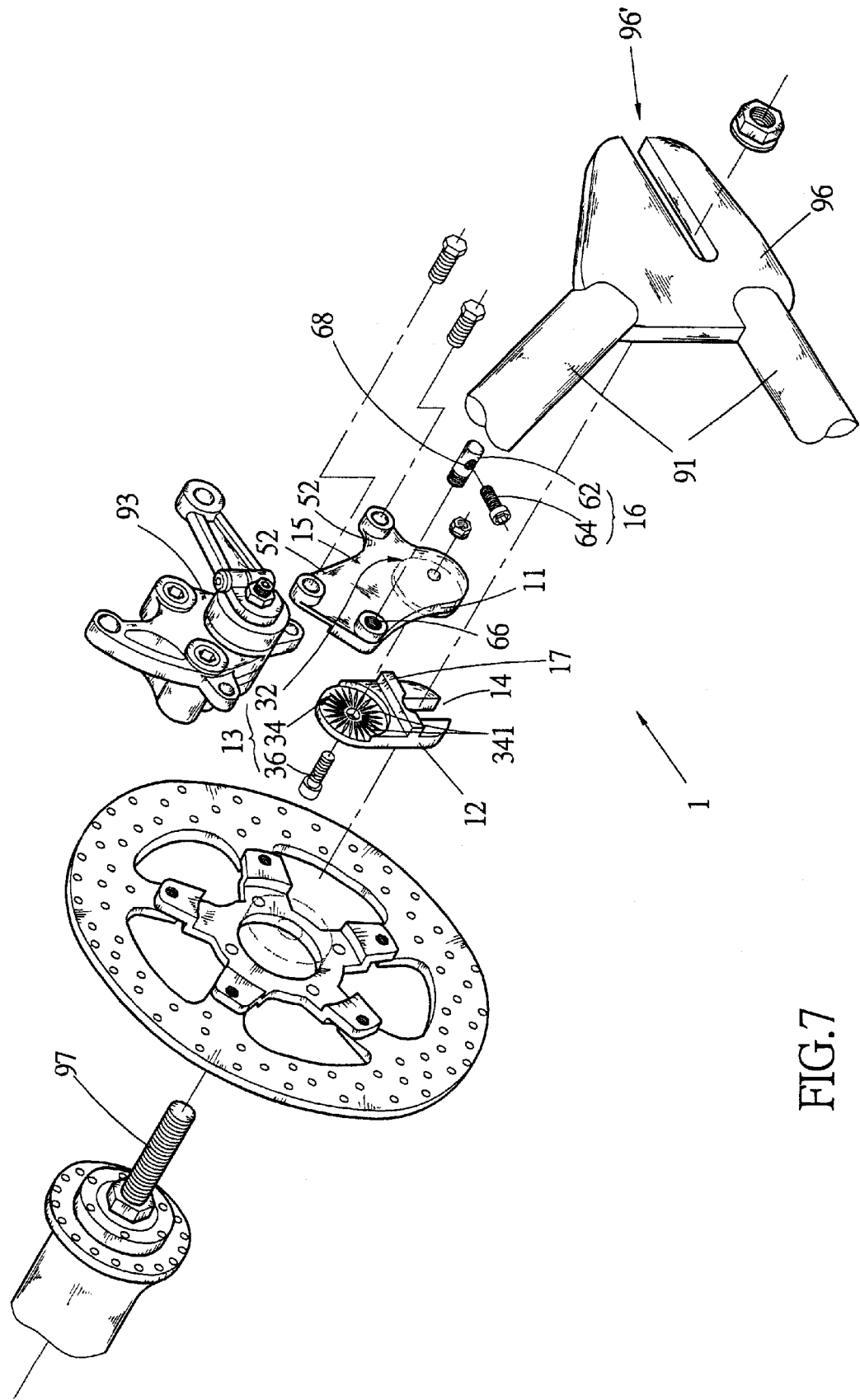
FIG. 7 is a perspective exploded view of a third embodiment of the present invention.

In FIG. 7, the stop section 16 includes a first and a second thread rods 62, 64. The first thread rod 62 is screwed into a first thread hole 66 formed on the left side of the upper bracket 11 by a predetermined length. The exposed portion of the first thread rod 62 is formed with a second thread hole 68. The second thread rod 64 is screwed in the second thread hole 68, whereby the stop section 16 can be multidirectionally adjusted to easily and truly abut against the frame body of the bicycle.

Figure 8:
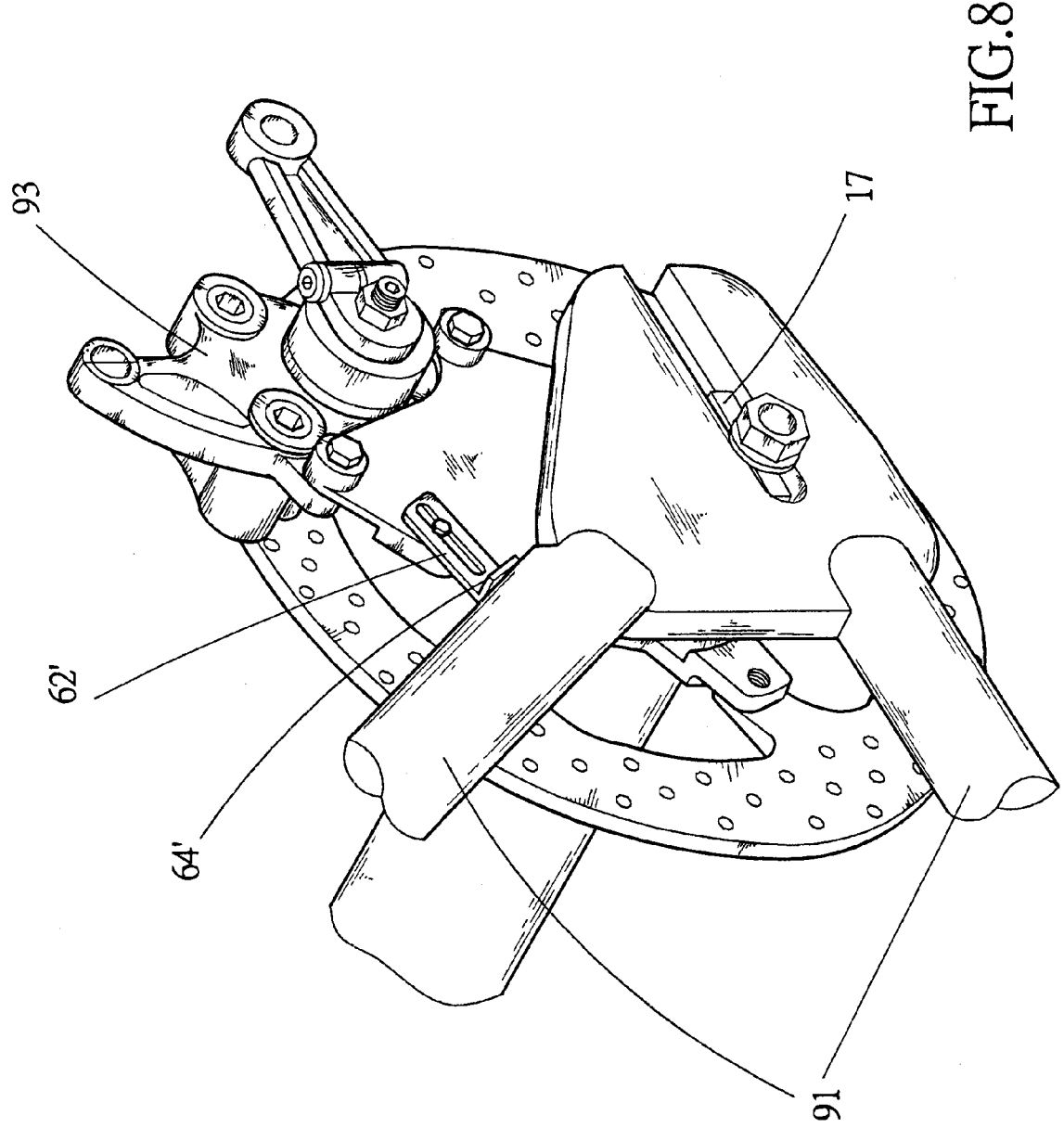
FIG. 8 is a perspective exploded view of a fourth embodiment of the present invention.

In FIG. 8, the stop section 16 includes a first and a second plate bodies 62', 64' connected with and perpendicular to each other. The first plate body 62' is formed with a slot extending along the long axis by a predetermined length. A bolt is passed through the slot and a hole of the left side of the upper bracket 11 to fix the first plate body 62'. This can also achieve the function of multidirectional adjustment.

Figure 9:
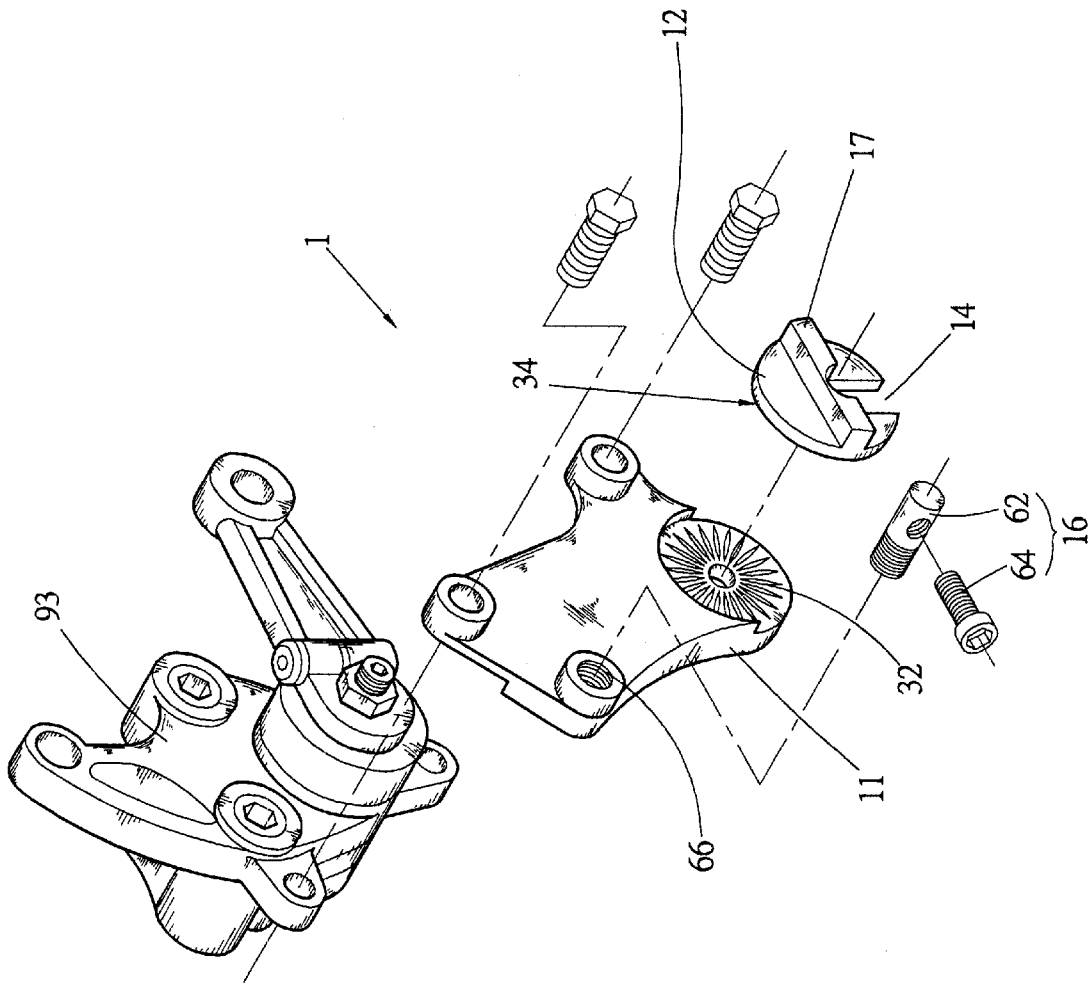
FIG. 9 is a perspective exploded view of a fifth embodiment of the present invention.

In FIG. 9, the central shafts of the upper and lower engaging sections 32, 34 of the adjustment section 13 are coaxial with the central shaft of the wheel shaft 97 of the bicycle. Accordingly, the present invention can be accurately adjusted and aligned.

The above embodiments are only used to illustrate the present invention, not intended to limit the scope thereof. Many modifications of the above embodiments can be made without departing from the spirit of the present invention.

What is claimed is:
1. Adjustable disc-brake bracket mounted on an end of the wheel shaft of a bicycle, comprising:
   an upper bracket which is a plate body having a predetermined shape;
   a lower bracket which is a plate body having a predetermined shape and disposed below the upper bracket;
   an adjustment section positioned between the upper and lower brackets for connecting the upper and lower brackets and adjusting the angle contained thereby;
   an insertion section which is a notch formed on lower end of the lower bracket, the insertion section being coaxially fitted on the end of the wheel shaft;
   a retaining seat which is a plate body outward extending from one end of a short axis of the upper bracket by a predetermined length and having a predetermined shape, the extending direction of the retaining seat and the short axis of the upper bracket containing a predetermined angle, a lateral side of the retaining seat having a retaining section for fixedly connecting with the disc brake apparatus of the bicycle; and
   a stop section disposed on the left end of the upper bracket for abutting against the frame body of the bicycle.

2. Adjustable disc brake bracket as claimed in claim 1, wherein the stop section is a projecting block.

3. Adjustable disc brake bracket as claimed in claim 1, wherein the adjustment section includes an upper engaging section, a lower engaging section and a fixing key, wherein:
   the upper engaging section is formed by several radial interval teeth formed on a predetermined portion of the upper bracket, the upper engaging section being formed with a through hole at the circular center;
   the lower engaging section is formed by several radial interval teeth formed on a predetermined portion of the lower bracket corresponding to the upper engaging section, the lower engaging section being formed with a through hole at the circular center; and
   the fixing key is fitted in the through holes of the upper and lower engaging sections for fixing the teeth thereof.

4. Adjustable disc brake bracket as claimed in claim 3, wherein the fixing key is a thread rod and a nut.

5. Adjustable disc brake bracket as claimed in claim 1, wherein the insertion section has an open end.

6. Adjustable disc brake bracket as claimed in claim 1, wherein the retaining section is formed by two holes spaced by a predetermined distance.

7. Adjustable disc brake bracket as claimed in claim 1, wherein the retaining section is formed by two lugs outward extending from one side of the retaining seat and spaced by a predetermined distance, each lug being formed with a hole.

8. Adjustable disc brake bracket as claimed in claim 1, further comprising a fixing section which is a rectangular projecting block adjacent to the insertion section and outward projecting from the front face of the lower bracket, the width of the fixing section being equal to the width of the split of the rear claw of the bicycle, whereby the fixing section is fitted in the split.

9. Adjustable disc brake bracket as claimed in claim 1, wherein the stop section includes first and a second thread rods, the first thread rod being screwed into a first thread hole formed on the left side of the upper bracket by a predetermined length, an exposed portion of the first thread rod being formed with a second thread hole, the second thread rod being screwed in the second thread hole.

10. Adjustable disc brake bracket as claimed in claim 1, wherein the stop section includes first and second plate bodies connected with and perpendicular to each other, the first plate body being formed with a slot extending along the long axis by a predetermined length, a bolt being passed through the slot and a hole of the left side of the upper bracket to fix the first plate body.

11. Adjustable disc brake bracket as claimed in claim 3, wherein central shafts of the upper and lower engaging sections of the adjustment section are coaxial with the central shaft of the wheel shaft of the bicycle.

* * * * *